United States Patent
Demonget et al.

(10) Patent No.: US 12,309,597 B2
(45) Date of Patent: May 20, 2025

(54) SYSTEMS AND METHODS FOR SERVICE-BASED AUTOMATIC IDENTITY SWITCHING FOR A DEVICE IN A PRIVATE NETWORK

(71) Applicant: Verizon Patent and Licensing Inc., Basking Ridge, NJ (US)

(72) Inventors: Sylvestre Demonget, Millburn, NJ (US); Anand J. Shah, Parsippany, NJ (US); David Albert Rossetti, Randolph, NJ (US); Madhusudan Mandyam Bheemarayan, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 17/932,695

(22) Filed: Sep. 16, 2022

(65) Prior Publication Data
US 2024/0098504 A1    Mar. 21, 2024

(51) Int. Cl.
*H04W 12/72* (2021.01)
*H04W 8/18* (2009.01)
*H04W 88/06* (2009.01)

(52) U.S. Cl.
CPC .......... *H04W 12/72* (2021.01); *H04W 8/183* (2013.01); *H04W 88/06* (2013.01)

(58) Field of Classification Search
CPC ..... H04W 12/72; H04W 12/37; H04W 12/45; H04W 12/69
See application file for complete search history.

(56) References Cited

U.S. PATENT DOCUMENTS

| | | | |
|---|---|---|---|
| 11,490,253 B1* | 11/2022 | Siryy | H04W 12/086 |
| 11,930,366 B1* | 3/2024 | Mariyani | H04L 63/0876 |
| 2004/0223602 A1* | 11/2004 | Honkasalo | H04L 47/822 370/351 |
| 2022/0286839 A1* | 9/2022 | Zhao | H04W 76/16 |
| 2022/0361240 A1* | 11/2022 | Gummadi | H04W 12/45 |
| 2023/0328522 A1* | 10/2023 | Shah | H04W 12/062 455/433 |
| 2024/0056485 A1* | 2/2024 | Xu | H04L 63/20 |

FOREIGN PATENT DOCUMENTS

EP    4132201 A1 *   2/2023   ............ H04W 12/72

* cited by examiner

*Primary Examiner* — Kevin Kim

(57) ABSTRACT

A system described herein may identify traffic associated with a User Equipment ("UE") that is connected to a first network. The UE may maintain a plurality of UE identities via one or more SIM ("Subscriber Identification Module") cards, Universal Integrated Circuit Cards ("UICCs"), etc. The system may determine, based on one or more policies, that the traffic is not authorized via the first network. In some situations, the traffic may not be authorized if the first network does not support a type, service, etc. of the traffic. The system may identify a second network, based on the one or more policies, via which the traffic is authorized, and may indicate the second network to the UE. The UE may automatically (e.g., without user intervention) switch to a particular UE identity that is associated with the second network, and may output the traffic via the second network using such UE identity.

20 Claims, 9 Drawing Sheets

SYSTEMS AND METHODS FOR SERVICE-BASED AUTOMATIC IDENTITY SWITCHING FOR A DEVICE IN A PRIVATE NETWORK

BACKGROUND

Wireless network providers may offer services such as wireless communication services, routing services, traffic processing services, or the like to User Equipment ("UEs") such as mobile telephones, Internet of Things ("IoT") devices, etc. Wireless network infrastructure such as radios, antennas, etc. may be deployed in geographical locations such that UEs are able to wirelessly communicate with such wireless network infrastructure and obtain wireless connectivity. Such UEs may, for example, send or receive traffic from a data network and/or a core network that is communicatively coupled to the wireless network infrastructure. Some networks may provide for shared access to radio frequency ("RF") resources, such as for different private networks, groups of UEs, etc. using the same physical network infrastructure (e.g., base stations, radios, antennas, etc.) for wireless connectivity. Private networks may enforce policies such as filtering policies, routing policies, etc. for various reasons, such as security, productivity, or the like. For example, a particular policy associated with a private network may indicate that certain types of traffic or communication sessions (e.g., voice calls, communication sessions with certain websites, etc.) are not permitted via the private network, and such traffic or communication sessions may be rejected when UEs request such communications via the private network.

DETAILED DESCRIPTION OF EXAMPLE EMBODIMENTS

The following detailed description refers to the accompanying drawings. The same reference numbers in different drawings may identify the same or similar elements.

Figure 1:
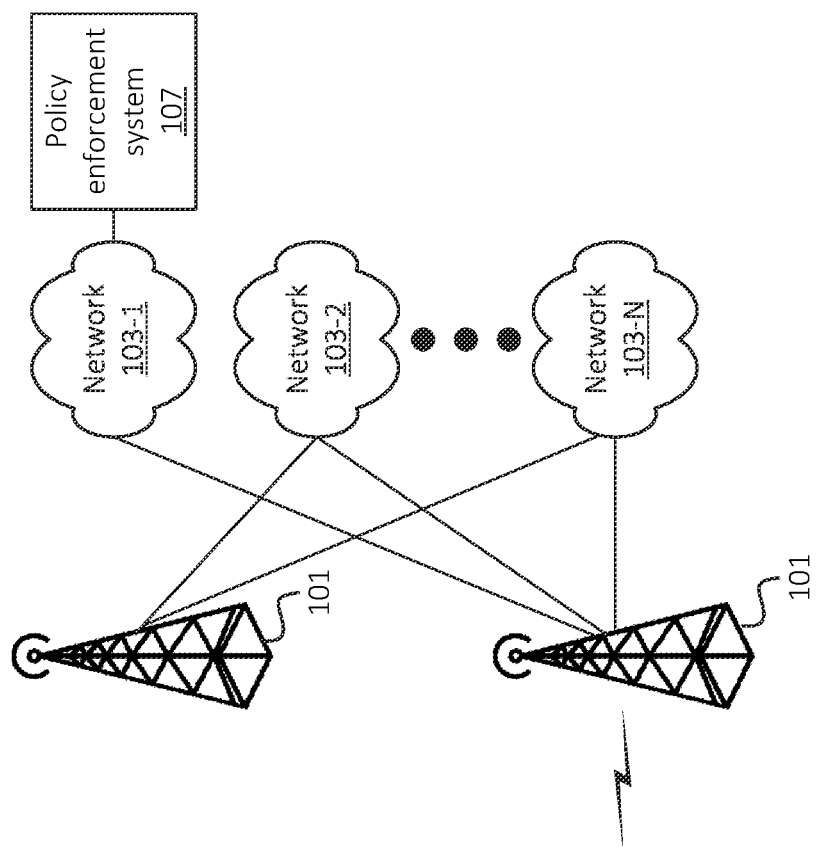
FIG. 1 illustrates an example overview of one or more embodiments described herein.
Figure 1:
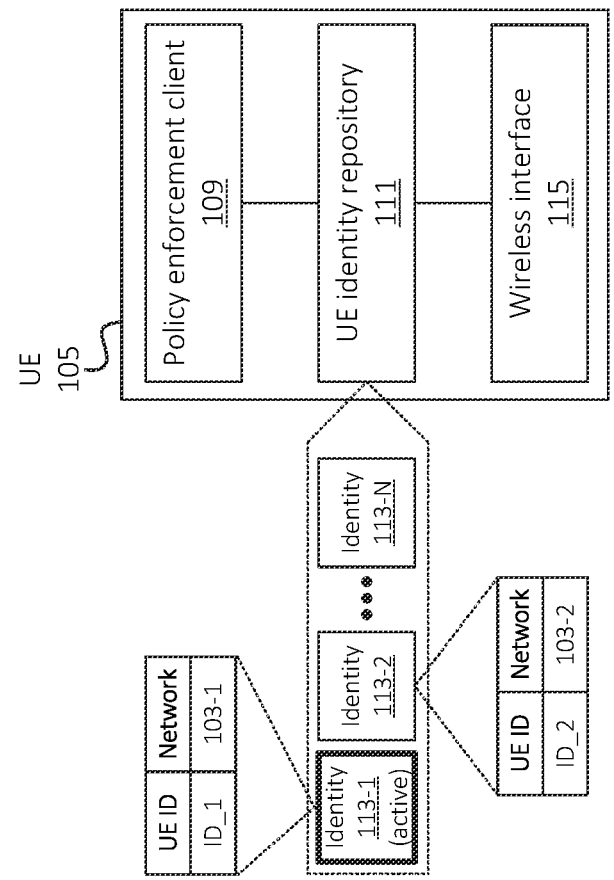

As shown in FIG. 1, one or more base stations 101 may be communicatively coupled to one or more networks 103. Each such network 103 may be, may include, may be included in, may be communicatively coupled to, etc. a core network of a wireless network, a private network, a wide area network such as the Internet, an enterprise network, etc. For example, in some embodiments, base stations 101 and the one or more networks 103 may operate according to a Multi-Operator Core Network ("MOCN") standard or other suitable standard, application programming interface ("API"), implementation, etc. whereby base stations 101 serve as a wireless interface for multiple networks 103.

Networks 103 may, in some embodiments, be implemented by discrete sets of devices or systems. For example, network 103-1 may be implemented by a first set of devices or systems that are communicatively coupled to base station 101, network 103-2 may be implemented by a second set of devices or systems that are communicatively coupled to base station 101, etc. For example, networks 103 may each be implemented by one or more Multi-Access/Mobile Edge Computing ("MEC") devices, referred to sometimes herein simply as "MECs," cloud systems, virtualized environments (e.g., based on the open-source Kubernetes application programming interface ("API") or some other suitable type of virtualized environment), datacenters, etc. Each network 103 may be associated with one or more identifiers, such as a Public Land Mobile Network ("PLMN") identifier, a Closed Subscriber Groups ("CSG") identifier, a Shared Home Network Identifier ("SHNI"), an Intent-Based Networking ("MN") identifier, Network Identifier ("NID"), a Closed Access Group ("CAG") identifier, a proprietary identifier, and/or some other type of identifier.

Base stations 101 may accordingly serve as a wireless interface between one or more such networks 103 and one or more UEs (e.g., mobile telephones, Internet of Things ("IoT") devices, autonomous vehicles, manufacturing robots, sensors, etc.), such as UE 105. In some embodiments, one or more networks 103 may be inaccessible via, may not be communicatively coupled to, etc. one or more base stations 101. For example, as shown, network 103-1 may be communicatively coupled to one particular base station 101, and may not be communicatively coupled to another base station 101. Network 103-1 may be, for example, a purpose-driven network such as a private network associated with a particular location such as an office building, a warehouse, a factory, etc., and may be accessible via one particular base station 101 (e.g., which is implemented at or is proximate to the particular location) and may be inaccessible via another base station 101 (e.g., which is implemented at some other location).

In some embodiments, UE 105 may be associated with a particular network, such as network 103-1, in this example. UE 105 may be "associated with" network 103-1 inasmuch as network 103-1 may maintain a set of policies that are enforced by one or more devices or systems of network 103-1 (e.g., policy enforcement system 107) and/or by one or more components, modules, applications, etc. of UE 105 (e.g., policy enforcement client 109). For example, such policies may indicate attributes, types, etc. of communications that UE 105 is authorized to send and/or receive via network 103-1 and/or one or more other networks. Additionally, or alternatively, the policies may indicate attributes, types, etc. of communications that are supported or are not supported by one or more networks 103.

As one example, the policies may indicate that UE 105 (and/or one or more other UEs, or all UEs) is not authorized to access a particular website via network 103-1, that UE 105 is not authorized to access a particular service (e.g., send and/or receive voice traffic, traffic associated with a particular application, etc.) via network 103-1, that network 103-1 does not support a particular type of service or communication session, and/or are that UE 105 is otherwise unauthorized to communicate via network 103-1. In accordance with some embodiments, as discussed herein, UE 105 may automatically connect to a different network 103 (e.g., network 103-2 and/or some other network) in order to conduct communications that would otherwise be unauthorized via network 103-1. For example, in accordance with some embodiments, UE 105 may automatically connect to network 103-2 to access the particular website which is not authorized via network 103-1.

As shown, in some embodiments, UE 105 may maintain UE identity repository 111 that includes multiple UE identities 113. UE identity repository 111 may be, may include, may be implemented by, etc. one or more Universal Integrated Circuit Cards ("UICCs"), one or more SIM ("Subscriber Identification Module") cards, one or more dual or multi SIM cards, one or more removable SIM cards, one or more embedded SIM cards, one or more cards or mechanisms that utilize one or more Universal SIM ("USIM") file systems (e.g., which may include a single card that utilizes multiple USIM file systems), some other type of storage device, and/or a combination thereof. In some embodiments, UE 105 may implement a Dual SIM Dual Standby ("DSDS") standard or some other suitable standard, protocol, API, etc. that allows UE 105 to maintain and select between (e.g., switch between) multiple different identities, profiles, SIM profiles, etc. (referred to simply as "identities" 113). In some embodiments, UE 105 may select one particular UE identity 113 as "active" at any given time, where other UE identities 113 (e.g., non-selected UE identities 113) may be "idle," "inactive," etc. For example, in FIG. 1, UE identity 113-1 is an active UE identity, and other UE identities (e.g., UE identities 113-2 through 113-N) are inactive.

Each identity 113, as referred to herein, may be associated with a particular UE identifier, such as an International Mobile Subscriber Identity ("IMSI"), a Subscription Permanent Identifier ("SUPI"), a Globally Unique Temporary Identifier ("GUTI"), and/or some other suitable type of identifier that is used to uniquely identify UE 105 when UE 105 communicates with one or more networks 103. In some embodiments, the UE identifiers may include, and/or may be associated with, network authentication credentials used to authenticate a given UE with a given network, such as a Ki credential, an OP key, etc. Thus, when UE identity 113-1 is active, as is shown in FIG. 1, UE 105 (e.g., wireless interface 115) may utilize an identifier associated with UE identity 113-1 (e.g., a particular IMSI, SUPI, GUTI, etc., represented in the figure as "ID_1") to communicate with one or more networks (e.g., via base station 101). In other scenarios, such as when UE identity 113-2, is active, UE 105 may utilize an identifier associated with UE identity 113-2 (represented in the figure as "ID_2") to communicate with one or more networks. UE 105 may "utilize" such identifiers inasmuch as UE 105 may include such identifiers in control plane signaling (e.g., registration requests, session establishment requests, etc.) and/or user plane signaling (e.g., outputting user plane traffic such as voice traffic, data traffic, etc.) sent by UE 105 and/or may use such identifiers to identify traffic sent to UE 105 from one or more networks 103 and/or base station 101.

In some embodiments, each identity 113 may be associated with one or more particular networks 103. For instance, in this example, UE identity 113-1 is associated with network 103-1, and UE identity 113-2 is associated with network 103-2. As discussed below, UE 105 (e.g., policy enforcement client 109) may automatically (e.g., without a selection from a user of UE 105) select a particular UE identity 113 when receiving an indication (e.g., from policy enforcement system 107 and/or from some other source) of a particular network 103 to which UE 105 should connect. For example, policy enforcement client 109 may automatically switch (or may instruct UE identity repository 111 to switch) UE 105 from UE identity 113-1 to UE identity 113-2 in situations where UE 105 is not authorized to communicate particular traffic via UE identity 113-1, but is authorized to communicate the traffic via UE identity 113-2.

Policy enforcement client 109 and UE identity repository 111 may, for example, communicate via one or more suitable APIs, interfaces, or other suitable communication pathways. As such, policy enforcement client 109 may be able to identify particular networks 103 that are associated with particular UE identities 113, and may be able to select, activate, etc. a particular UE identity 113 (e.g., based on instructions or other communications from policy enforcement system 107 indicating a particular network 103, as discussed below), and/or may be able to instruct UE identity repository 111 to select, activate, etc. a particular UE identity 113.

Automatically connecting to a network for which particular traffic is authorized (e.g., when such traffic is not authorized or is not supported via another network, such as a network to which UE 105 is already connected) may allow for UE 105 to communicate different types of traffic, services, etc., including traffic that is not authorized or is not supported via a particular network (e.g., network 103-1). In this manner, networks may maintain policies in order to maintain security, load balancing, or other considerations associated with such networks, while still allowing for UEs 105 to send and receive other types of traffic that would otherwise not be authorized or supported via the networks (e.g., via other networks such as a public network from a Mobile Network Operator ("MNO"), other private networks, etc.). Further, the switching may be performed automatically in some embodiments, thereby providing a seamless experience to users of UEs 105.

Figure 2:
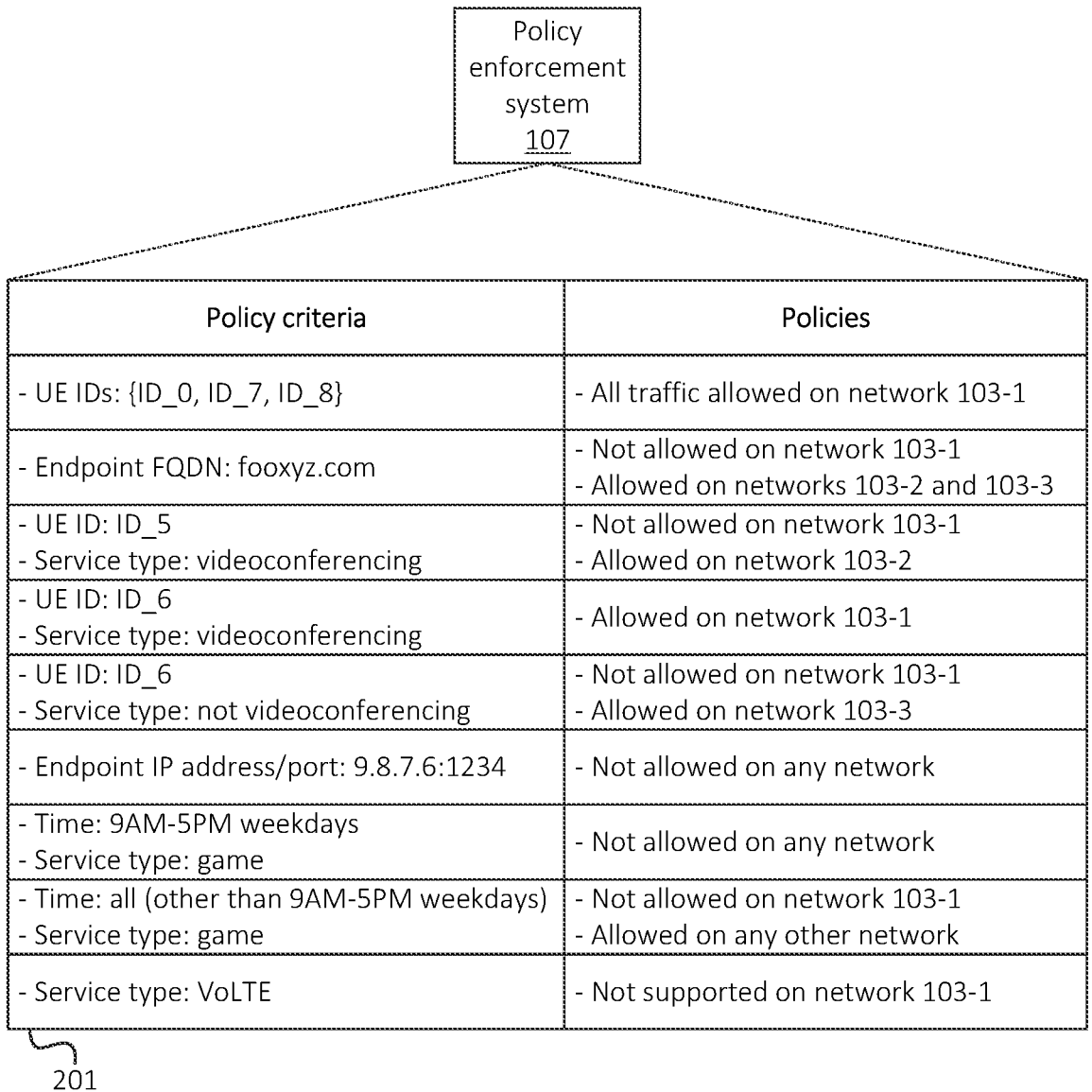
FIG. 2 illustrates an example data structure that includes policy information, in accordance with some embodiments.

FIG. 2 illustrates an example data structure 201 that includes policy information that may be maintained by policy enforcement system 107 to facilitate, for example, UE identity switching in accordance with some embodiments. In some embodiments, some or all of the policy information stored by policy enforcement system 107 (e.g., as described with respect to data structure 201) may be stored by policy enforcement client 109 associated with a given UE 105 and/or some other suitable device or system. The policy information may be received from an administrator (e.g., via manual input), and/or may be generated and/or modified using automated techniques, such as artificial intelligence/machine learning ("AI/ML") techniques or other suitable techniques. In this example, policy information is described as being associated with a set of criteria, and policies or actions to enforce when particular sets of criteria are met. In some embodiments, policy information may be maintained or denoted in some other suitable manner.

As shown, for example, data structure 201 may include policy criteria such as UE identifiers, which may include IMSI, International Mobile Station Equipment Identity ("IMEI"), SUPI, GUTI, Internet Protocol ("IP") address, Mobile Directory Number ("MDN"), and/or other suitable UE identifiers. In practice, lists of identifiers of UEs to be treated the same way by the policy may be determined based on identifying devices with similar labels, categories, characteristics, group identifiers, etc., such as employee smartphones, Automated Guided Vehicles ("AGVs"), smart vision cameras, etc. In some embodiments, policy criteria may include traffic attributes, such as an endpoint identifier indicating a device or system with which a given UE 105 communicates (e.g., an application server, a content streaming platform, another UE 105, etc.). The endpoint identifier may include an IP address, a Fully Qualified Domain Name ("FQDN"), a port number, and/or some other suitable identifier. In some embodiments, the traffic attributes may include a service or application type, such as a voice service, a content streaming service, an augmented reality ("AR") service, a gaming service, etc. In some embodiments, other traffic attributes may be indicated in data structure 201, such as network slice (e.g., a Network Slice Selection Assistance Information ("NSSAI") value or other suitable value), a Quality of Service ("QoS") indicator such as a 5G QoS Identifier ("5QI") value or a QoS Class Identifier ("QCI"), tags or labels, and/or other identifiable attributes. Generally, the traffic attributes included in data structure 201 may be attributes that may be detectable with respect to traffic, such as attributes or values included in header information of traffic, and/or that is able to be detected via deep packet inspection or using some other suitable technique.

In some embodiments, policy criteria may include criteria that is not specifically tied to a given UE or to particular traffic attributes. For example, policy criteria may include time-based criteria, location-based criteria (e.g., based on a location of a given UE), event-based criteria (e.g., criteria based on the occurrence of a particular event or other type of trigger), load-based criteria (e.g., based on one or more measure of load associated with a given network 103), or other suitable criteria.

In some embodiments, policy criteria may include a combination of multiple types of criteria. For instance, in the example of FIG. 2, data structure 201 indicates different policies to apply for different UEs for the same service type. For example, a UE represented with the identifier "ID_5" may be associated with a first set of policies for videoconferencing traffic (e.g., a policy whereby such traffic is not allowed or authorized on network 103-1, and is allowed on network 103-2), while a UE represented with the identifier "ID_6" may be associated with a different second set of policies for the same type of traffic (e.g., a policy whereby such traffic is allowed on network 103-1). Such a situation may occur when an administrator, operator, etc. of network 103-1 authorizes some UEs to send and receive videoconferencing traffic via network 103-1, and does not authorize other UEs to send and receive videoconferencing traffic via network 103-1.

In some embodiments, the same UE may be associated with different policies for different types of traffic and/or under different conditions. For example, as shown, the UE represented with the identifier "ID_6" may be associated with one set of policies for videoconferencing traffic, and may be associated with another set of policies for other traffic. Such a situation may occur when an administrator, operator, etc. of network 103-1 authorizes this UE to send and receive videoconferencing traffic via network 103-1, and all other traffic via network 103-2.

As shown, some policies may include restricting certain types of traffic on all networks (represented by "not allowed on any network" in the figure). For example, certain endpoints may be identified as malicious, dangerous, etc. and may be restricted entirely. As another example, certain traffic types (e.g., game traffic) may be restricted from all networks during certain times (e.g., during working hours on weekdays), but the same traffic types may be allowed on one or more networks during other times.

While some examples of policies and policy criteria are shown in FIG. 2, in practice, policies an policy criteria may be implemented differently, and/or may include different types of criteria and/or policies. In some embodiments, AI/ML models or other types of models may be used to indicate policies and/or policy criteria. In this manner, policies and/or policy criteria may be iteratively refined over time in order to optimize one or more suitable measures of yield, performance, user experience, network efficiency, etc.

In some situations, traffic associated with a particular set of attributes (e.g., a particular endpoint, a particular service type, etc.) may not be supported by a given network 103. For example, network 103 may be a private network that does not include the capability to handle certain services, such as Voice over LTE ("VoLTE") calls, Voice over New Radio ("VoNR") calls, or other particular services. For example, network 103 may not include an IP Multimedia Subsystem ("IMS") network that would be used to process, route, etc. VoLTE calls or VoNR calls. The policy criteria may accordingly include such attributes (e.g., service type, endpoint identifier, etc.) for unsupported services, and may include a "not allowed" or "not supported" entry in data structure 201 for such services.

In some embodiments, data structure 201 or some other data structure may include information regarding traffic attributes, services, etc. of traffic that is supported by one or more networks 103. In such embodiments, the absence of such information may indicate that certain traffic attributes, services, etc. are not supported by a given network 103. For example, data structure 201 may include information indicating that AR services are supported by a given network 103, but may omit (e.g., not include) information indicating that VoLTE services are supported by the given network 103. In this example, policy enforcement system 107 may determine that VoLTE traffic is not supported, not allowed, not authorized, etc. via the given network 103. Although an example arrangement for data structure 201 is provided in FIG. 2, in practice, data structure 201 and/or the information presented therein may be arranged or grouped differently.

Figure 3:
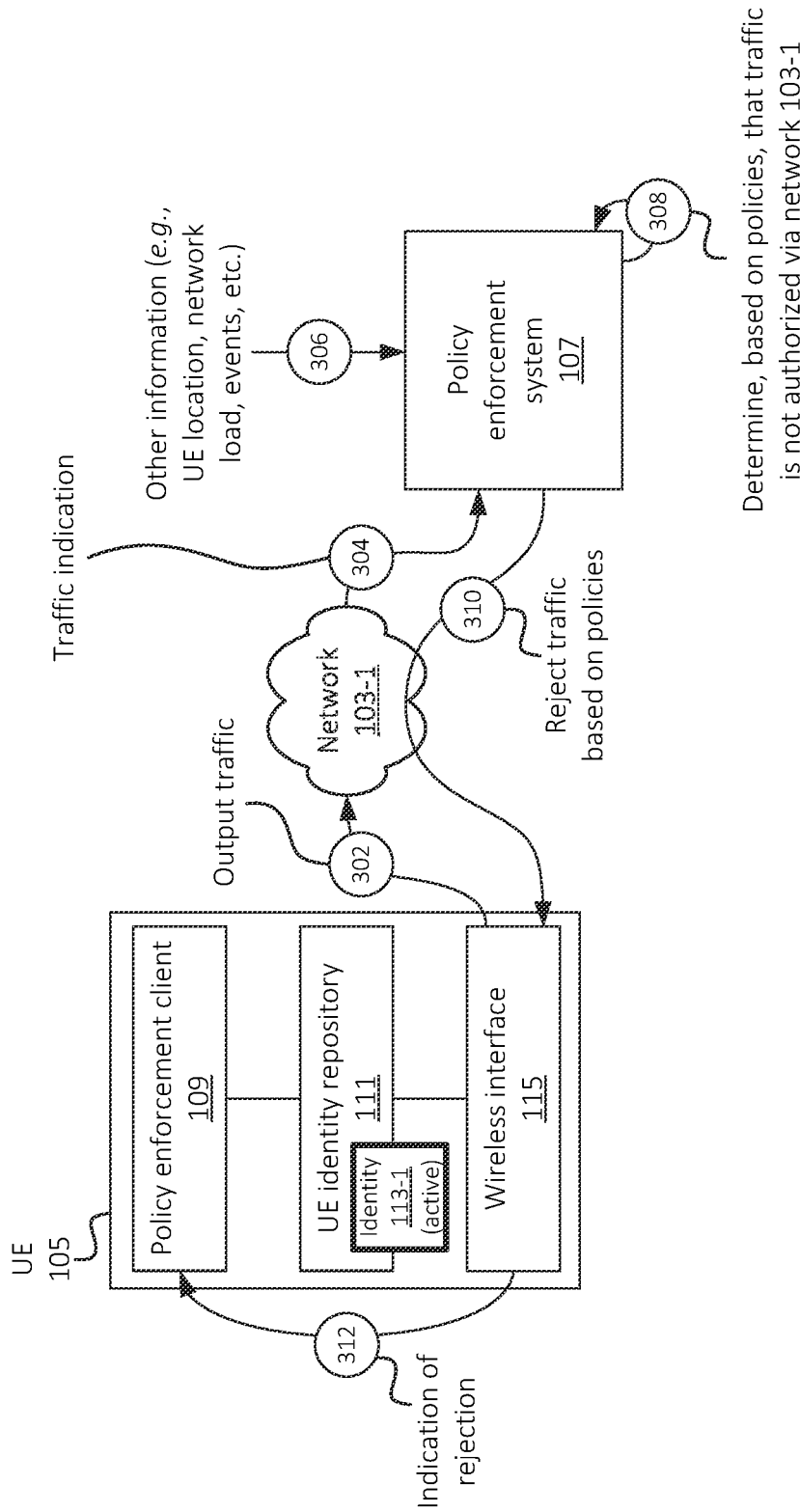
FIG. 3 illustrates the example rejection of traffic via a particular network based on one or more policies, in accordance with some embodiments.
Figure 4:
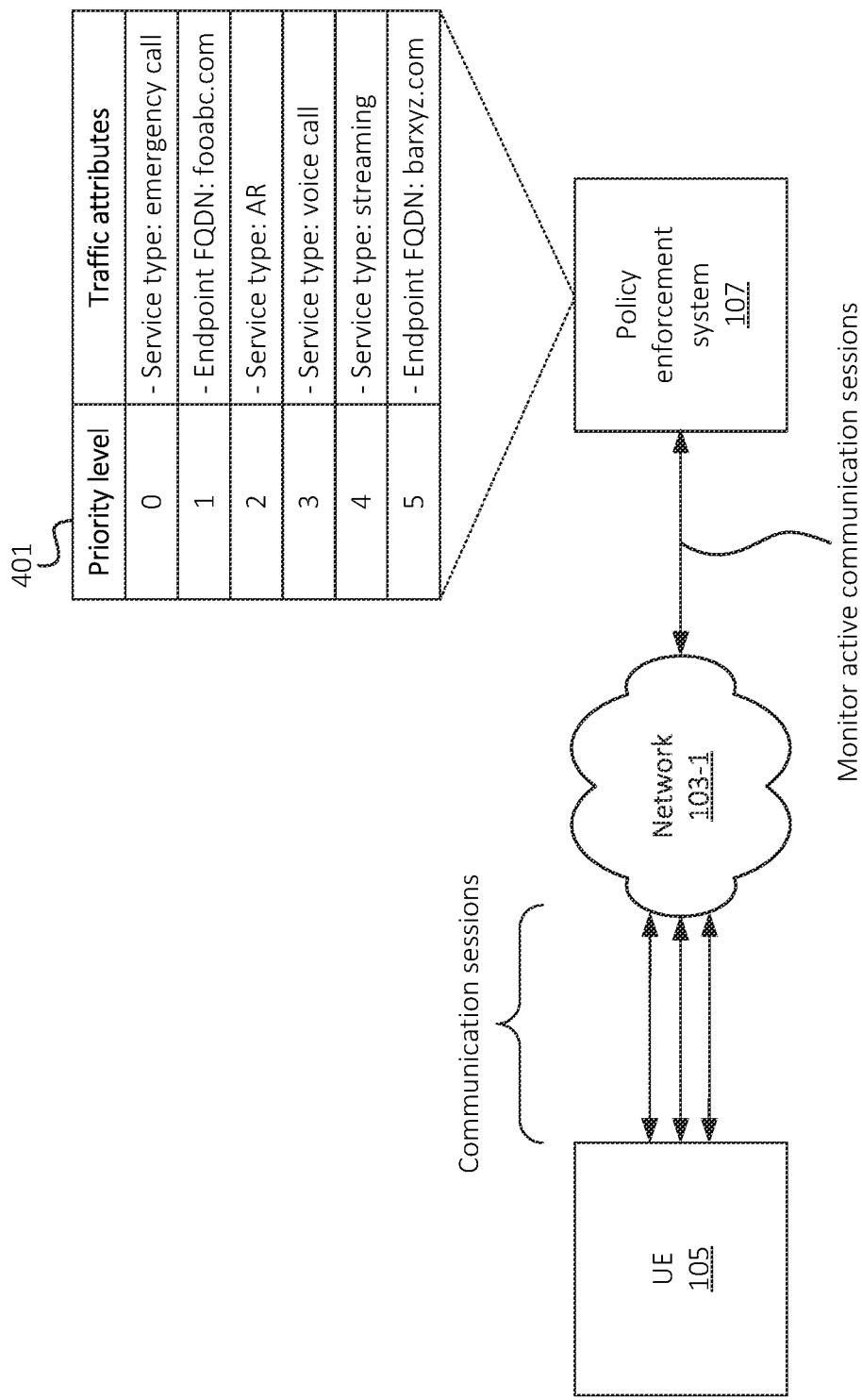
FIG. 4 illustrates example priority information for different types of traffic, in accordance with some embodiments.

FIGS. 3 and 4 illustrate an example of the automatic switching of UE identities 113 based on one or more policies. As shown in FIG. 3, for example, UE 105 (e.g., wireless interface 115) may output (at 302) particular traffic, which may include a communication request, user plane or application traffic, or other types of traffic. Assume in this example that UE 105 is associated with identity 113-1. That is, identity 113-1 may be an active identity, and wireless interface 115 may utilize one or more UE identifiers (e.g., IP address, MDN, SUPI, GUTI, etc.) indicated by the particular identity 113-1 when communicating with network 103-1. Further assume, in this example, that UE 105 is connected to network 103-1 (e.g., via base station 101), via which policy enforcement system 107 is reachable by UE 105. For example, network 103-1 may be a private network and policy enforcement system 107 may be associated with one or more addresses (e.g., IP addresses) that are reachable via the private network. As such, UE 105 may output (at 302) the traffic, via network 103-1, and may indicate a destination of the traffic, such as an element of network 103-1, an application server that is communicatively coupled to network 103-1 or another network, another UE 105, etc.

For example, header information of the traffic may include one or more endpoint identifiers associated with the destination of the traffic. Additionally, or alternatively, the traffic (e.g., header information) may include other identifiable attributes, such as an identifier of UE 105 (e.g., an IP address, an MDN, an IMEI, an IMSI, a SUPI, a GUTI, etc.), a service type associated with the traffic (e.g., voice, content streaming, autonomous vehicle control, etc.), a QoS-related value (e.g., NSSAI or other network slice indicator, 5QI, QCI, etc.), and/or other information. In some embodiments, the traffic may include a location of UE 105, a cell identifier associated with base station 101 to which UE 105 is connected, and/or other types of information.

Policy enforcement system 107 may receive (at 304) an indication that UE 105 outputted the traffic via network 103-1. For example, policy enforcement system 107 may receive the indication from one or more elements of network 103-1 that receive, forward, route, etc. the traffic. Such elements may include one or more routers, hubs, a User Plane Function ("UPF"), a Packet Data Network ("PDN") Gateway ("PGW"), a Service Capability Exposure Function ("SCEF"), a Network Exposure Function ("NEF"), and/or some other element of network 103-1. In some embodiments, policy enforcement system 107 may be implemented at the same device or system, datacenter, etc. that implements one or more elements or Virtualized Network Functions ("VNFs") or Containerized Network Functions ("CNFs") of network 103-1, such as a UPF, a PGW, a Session Management Function ("SMF"), a Serving Gateway ("SGW"), and/or some other element of network 103-1 that receives, routes, forwards, etc. control plane or user plane traffic from UE 105. In some embodiments, some or all of the functionality described with respect to policy enforcement system 107 may be performed by one or more elements of network 103-1 (e.g., one or more of the above-mentioned elements and/or other elements). In some embodiments, some or all of the functionality of policy enforcement system 107 may be performed by one or more devices or systems that are communicatively coupled to one or more elements of network 103-1.

Policy enforcement system 107 may receive (at 304) the indication via an API, and/or via some other suitable interface or communication pathway. In some embodiments, policy enforcement system 107 may receive, inspect, etc. all traffic from UE 105. In some embodiments, policy enforcement system 107 may receive less than all (e.g., only a portion) of traffic received from UE 105 via network 103-1, such as only header information, only communication session establishment requests (e.g., protocol data unit ("PDU") session establishment requests), and/or portions of traffic satisfying other criteria.

In some embodiments, policy enforcement system 107 may receive or otherwise identify (at 306) other information that may be relevant to policy information (e.g., as discussed above with respect to data structure 201), such as a location of UE 105, a measure of load of network 103-1, a current time or date, the occurrence of one or more events (e.g., sporting events, weather-related events, emergency events, arrival of shipments at a warehouse, etc.), network load metrics, etc. Policy enforcement system 107 may receive such information from one or more elements of network 103-1 (e.g., an Access and Mobility Management Function ("AMF"), a Mobility Management Entity ("MME"), and/or some other device or system that maintains location information of UE 105), one or more sensors, one or more application servers, and/or some other suitable source.

Policy enforcement system 107 may determine (at 308) that the traffic is not authorized via network 103-1. For example, policy enforcement system 107 may determine that a requested communication session (e.g., PDU session, IP session, videoconferencing session, etc.) is not authorized via network 103-1. As another example, policy enforcement system 107 may determine that one or more packets are not authorized to be sent via network 103-1.

In some embodiments, the information received or maintained (at 306) may include information regarding active communication sessions between UE 105 and network 103-1 (e.g., active PDU sessions or other types of communication sessions). For example, as shown in FIG. 4, UE 105 may have one or more active communication sessions with 103-1 (e.g., with one or more UPFs, PGWs, etc. of network 103-1). Each communication session may be associated with one or more attributes, such as network slice, QoS values, traffic and/or service types, etc. Policy enforcement system 107 may monitor, receive, etc. the communication session information from one or more elements of network 103-1 (e.g., a UPF, a PGW, etc.). In this manner, policy enforcement system 107 may maintain and/or receive up-to-date information regarding active communication sessions between UE 105 and network 103-1.

Policy enforcement system 107 may further receive, maintain, etc. traffic priority information, which may indicate particular types or other attributes of traffic along with respective priority levels that may be used for UE identity switching in accordance with embodiments described herein. For example, such information may be maintained in data structure 401 and/or in some other suitable format. As shown, for example, data structure 401 may indicate that traffic or communication sessions associated with emergency calls have a highest priority level (e.g., priority level 0), that traffic associated with a particular endpoint FQDN of "fooabc.com" is associated with a next highest priority level, and so on. In some embodiments, the traffic priority information may be used in determining, as discussed below, how to handle traffic received from UE 105. Generally, policy enforcement system 107 may avoid terminating active communication sessions that are associated with a higher priority level, in order to allow communication sessions or traffic associated with a lower priority level via an alternate network 103.

Returning to FIG. 3, policy enforcement system 107 may determine (at 308) whether the traffic outputted (at 302) by UE 105 is authorized via network 103-1. For example, policy enforcement system 107 may compare the attributes of the traffic, attributes or identifiers of UE 105 (e.g., as received (at 304) via the traffic indication), temporal information, UE location information (e.g., as received (at 306) from one or more other information sources), active communication session information (e.g., as monitored and/or maintained in data structure 401), etc. to the policy information (e.g., as maintained in data structure 201). For example, policy enforcement system 107 may determine whether one or more policy criteria are met, and may determine policies associated with the policy criteria. In the event that an identified policy indicates that the traffic is allowed or authorized via network 103-1, policy enforcement system 107 may forgo restricting, rejecting, etc. the traffic. For example, policy enforcement system 107 may output an indication that the traffic is authorized, may forward the traffic toward its destination, and/or may perform one or more other suitable actions to allow the traffic. In some embodiments, policy enforcement system 107 may forgo performing any action when determining that the traffic is allowed via network 103-1. That is, in instances where policy enforcement system 107 determines that traffic is allowed, the absence of any action or instruction by policy enforcement system 107 to reject, block, etc. the traffic may serve to allow the traffic to be carried, routed, etc. via network 103-1.

In this example, policy enforcement system 107 may determine (at 308) that the traffic is not authorized via network 103-1. For example, referring to the policies shown in data structure 201, the traffic may be associated with an endpoint FQDN of "fooxyz.com," and therefore the traffic is not allowed on network 103-1. As another example, UE 105 may be associated with an identifier represented by "ID_5" and the service type of the traffic may be "videoconferencing," and the traffic may accordingly not be allowed on network 103-1. As yet another example, the service type of the traffic may be "game" and policy enforcement system 107 may determine that a present time is 10:00 PM on a weekend, and the traffic may accordingly not be allowed on network 103-1. In other situations, policy enforcement system 107 may determine that the traffic is not allowed based on one or more other policy criteria. As noted above, in some embodiments, policy enforcement system 107 may determine that the traffic is not supported by network 103-1 or is not allowed via network 103-1 for some other reason.

Policy enforcement system 107 may output (at 310) a rejection of the traffic. For example, policy enforcement system 107 may output a notification to UE 105 (e.g., via an API implemented by policy enforcement system 107 and policy enforcement client 109, via an Hypertext Transfer Protocol ("HTTP") message (e.g., a 400 "bad request" message, a 401 "unauthorized" message, etc.), via a text message, and/or via some other suitable communication), indicating that the traffic was rejected. Additionally, or alternatively, policy enforcement system 107 may output a notification to an element of network 103-1 (e.g., a UPF, a PGW, an SMF, an SGW, etc.), indicating that the traffic was rejected. In such scenarios, network 103-1 may indicate a rejection of the traffic to UE 105 (e.g., via an HTTP error message or some other suitable message). In some embodiments, the rejection notification may include a cause code, an indication of a policy based on which the traffic was rejected, and/or some other indication of why the traffic was rejected.

In this manner, UE 105 may receive an indication that the traffic was rejected, which may include an indication of particular traffic (e.g., particular data packets, a particular communication request, etc.) that was rejected or that is otherwise not allowed via network 103-1. Policy enforcement client 109 may accordingly receive (at 312) an indication of the rejection (e.g., from policy enforcement system 107, from an element of network 103-1, and/or from some other source) via wireless interface 115. As such, policy enforcement client 109 may be "aware" of particular traffic that was rejected via network 103-1, and reasons for the rejection.

In some embodiments, UE 105 (e.g., wireless interface 115, policy enforcement client 109, an application executing on UE 105, an operating system of UE 105, and/or some other component of UE 105) may cache, buffer, etc. some or all outbound traffic. In this manner, when receiving an indication that particular traffic was rejected, UE 105 may identify the cached, buffered, traffic that was rejected. As discussed below, the cached traffic may be re-sent via another network 103, in some instances.

Figure 5:
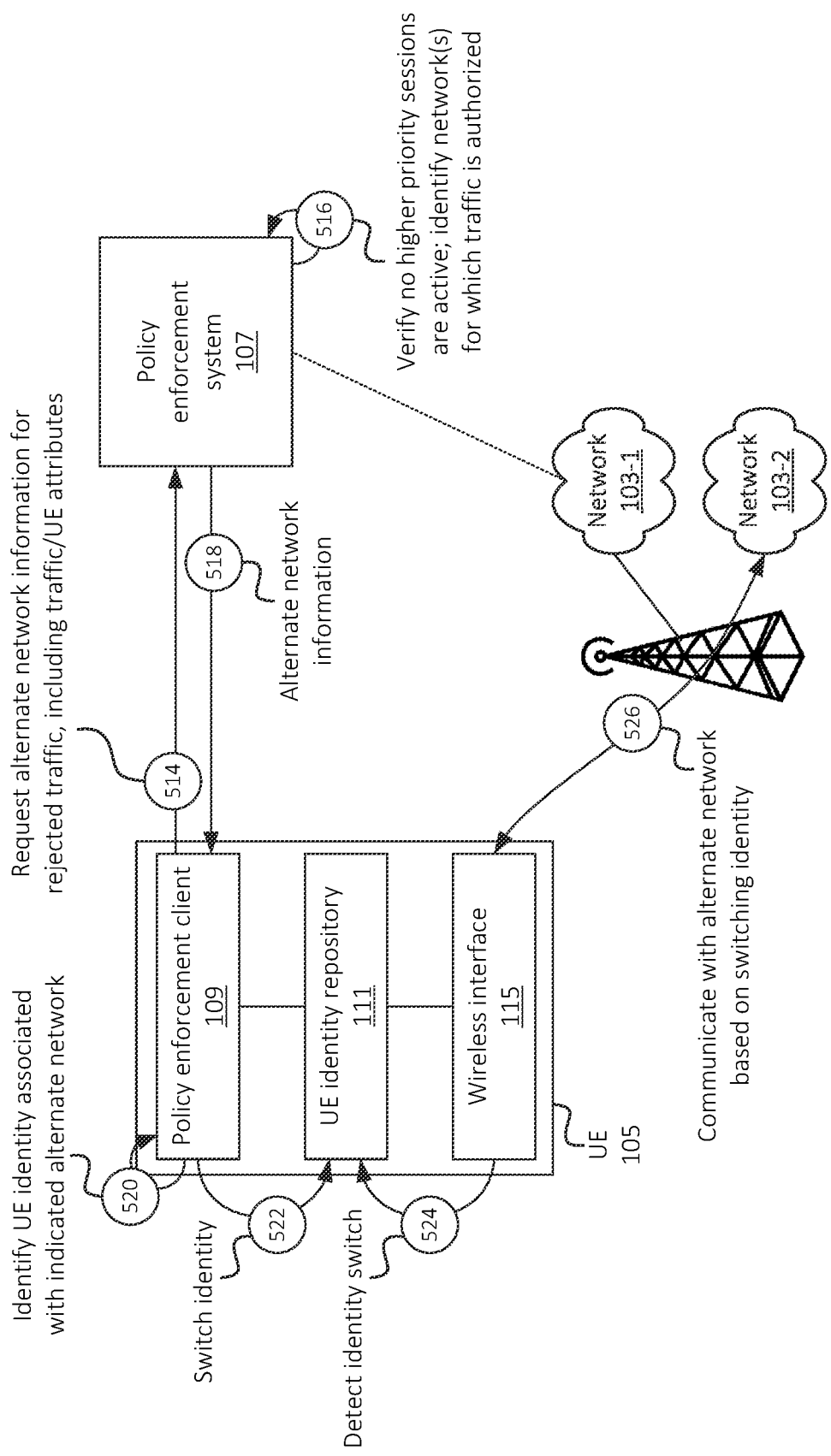
FIG. 5 illustrates an example of switching UE identities based on rejected traffic, in accordance with some embodiments.

For example, as shown in FIG. 5, after receiving an indication of rejected traffic, policy enforcement client 109 may request (at 514) alternate network information for the rejected traffic. For example, while UE 105 is still connected to network 103-1, policy enforcement client 109 may communicate with policy enforcement system 107 via network 103-1. The request for alternate network information may include attributes of the rejected traffic, UE attributes, a cause code or policy based on which the traffic was rejected, and/or other suitable information.

Based on receiving the request from policy enforcement client 109, policy enforcement system 107 may identify one or more other networks 103 for which the traffic is authorized. For example, policy enforcement system 107 may identify one or more policies, which may include the policy or policies based on which the traffic was rejected. Such policies may indicate another network 103 for which the traffic is authorized. For example, referring to the example policies shown in data structure 201, if the traffic was rejected based on being associated with an endpoint FQDN of "fooxyz.com," then policy enforcement system 107 may identify that the traffic is allowed on networks 103-2 and 103-3. As another example, if the traffic was rejected on the basis of UE identifier (e.g., represented by the example identifier "ID_5") and service type (e.g., videoconferencing), then policy enforcement system 107 may identify that the traffic is allowed on network 103-2. In other examples, policy enforcement system 107 may identify one or more other networks 103, on which the traffic is allowed, in some other suitable manner.

In some embodiments, policy enforcement system 107 may further evaluate attributes of the rejected traffic to attributes of currently active communication sessions between UE 105 and network 103-1. For example, in some embodiments, policy enforcement system 107 may identify a priority level associated with the rejected traffic and one or more priority levels of currently active communication sessions. If the rejected traffic is associated with a higher priority than all active communication sessions, then policy enforcement system 107 may proceed with subsequent operations described herein, in which alternate network information is provided (at 518) to UE 105, based on which UE 105 may connect to a different network 103 (e.g., a network for which the rejected traffic is allowed). If, on the other hand, the rejected traffic is associated with a lower priority than any active communication session, then policy enforcement system 107 may forgo providing (at 518) alternate network information to UE 105. Generally, policy enforcement system 107 may avoid terminating, "kicking off," interrupting, etc. higher priority traffic in order to facilitate lower priority traffic. In such instances, policy enforcement system 107 may provide a notification that the lower priority traffic has been rejected based on the existence of higher priority communication sessions.

While some examples are provided above of how policy enforcement system 107 may evaluate, analyze, etc. the respective priority levels of rejected traffic against priority levels of currently active sessions, in practice, policy enforcement system 107 may perform other types of operations and/or use different logic to verify that switching networks (e.g., potentially interrupting currently active communication sessions) does not violate priority-related constraints or policies. For example, policy enforcement system 107 may provide alternate network information (e.g., based on which UE 105 may switch identities, as discussed below) in some situations where the rejected traffic is a lower priority than currently established communication sessions, such as in situations where there is an exception (e.g., an emergency event, network congestion, etc.). As another example, policy enforcement system 107 may generate one or more scores or other metrics based on attributes of the rejected traffic and/or based on attributes of the currently established sessions, and may determine whether to provide the alternate network information based on comparing the scores to each other and/or to one or more thresholds.

In this example, assume that policy enforcement system 107 has identified (at 516) that the rejected traffic is allowed via network 103-2, and that allowing UE 105 to switch to network 103-2 does not violate priority-related constraints or policies (e.g., does not interrupt higher priority communication sessions that are already established via network 103-1). As such, policy enforcement system 107 may output (at 518) alternate network information, which may include one or more identifiers of network 103-2. In some embodiments, policy enforcement system 107 may provide (at 518) parameters relating to how long UE 105 should connect to 103-2 (e.g., where such duration may be indicated by one or more policies or may be determined in some other suitable manner), how much data UE 105 is authorized to send and/or receive via network 103-2, and/or other parameters relating to UE 105 connecting to network 103-2.

UE 105 (e.g., policy enforcement client 109) may identify (at 520) a particular UE identity that is associated with the indicated alternate network 103-2. For example, policy enforcement client 109 may identify UE identity 113-2 based on information in UE identity repository 111, indicating that UE identity 113-2 is associated with network 103-2. For example, policy enforcement client 109 may identify that UE identity 113-2 includes or is associated with an identifier of network 103-2, such as a PLMN identifier, a CSG identifier, an NID identifier, a CAG identifier, a proprietary identifier, or some other suitable identifier. Policy enforcement client 109 may further identify a respective UE identifier that is included in or is associated with UE identity 113-2, such as an IMSI, a SUPI, a GUTI, etc.

Policy enforcement client 109 may accordingly switch (at 522) to the identified UE identity 113-2. For example, policy enforcement client 109 may output an instruction to UE identity repository 111 (e.g., to a UICC, a SIM card, a dual SIM card, etc.) to switch UE from a currently active identity (e.g., UE identity 113-1) to the identified UE identity 113-2. In some embodiments, wireless interface 115 may detect (at 524) that the identity of UE 105 has been switched, which may include one or more suitable communications between UE identity repository 111 and wireless interface 115 (e.g., via an API, a secure interface, an operating system of UE 105, and/or via some other suitable communication pathway). Based on detecting that the identity of UE 105 has been switched to UE identity 113-2, wireless interface 115 may register, connect, etc. to network 103-2 (e.g., via base station 101) using the UE identifier included in the newly selected UE identity 113-2. UE 105 may proceed to communicate (at 526) with network 103-2, which may include resending or retrying the rejected traffic (e.g., in embodiments where the traffic was cached, buffered, etc., as discussed above).

In some embodiments, after switching to UE identity 113-2 and connecting to network 103-2, policy enforcement client 109 may cause UE 105 (e.g., UE identity repository 111) to switch back to UE identity 113-1, such as for security reasons while UE 105 is within a coverage area of network 103-1. For example, policy enforcement client 109 may instruct UE identity repository 111 to switch back to UE identity 113-1 after a particular duration of time indicated in the alternate network information. As another example, policy enforcement client 109 may determine that UE 105 is idle or is sending and/or receiving less than a threshold amount or throughput of traffic, which may indicate that a service or session for which UE 105 switched to network 103-2 has concluded. In some embodiments, policy enforcement client 109 may cause UE 105 to switch back to UE identity 113-1, and therefore reconnect to network 103-1, based on an instruction from policy enforcement system 107 or some other device or system, or based on one or more other triggering events.

In some embodiments, in lieu of policy enforcement client 109 requesting (at 514) alternate network information from policy enforcement system 107 after receiving (e.g., at 312) a rejection of traffic, the rejection itself may include alternate network information. For example, after determining (at 308) that particular traffic is not authorized or is not supported via network 103-1, policy enforcement system 107 may identify (at 516) a different network (e.g., network 103-2), and may provide the alternate network information along with the rejection.

In some embodiments, policy enforcement client 109 may maintain policy information (e.g., some or all of the information discussed with respect to data structures 201 and/or 401) locally at UE 105 for faster processing, and may proactively reject traffic that violates one or more policies (e.g., is not authorized or is not supported via network 103-1) prior to such traffic being sent to network 103-1. In such instances, policy enforcement client 109 may identify an alternate network (e.g., network 103-2), may verify that switching would not disrupt currently active sessions with a higher priority (e.g., as discussed above), and may automatically switch to UE identity 113-2, prior to outputting the traffic.

Figure 6:
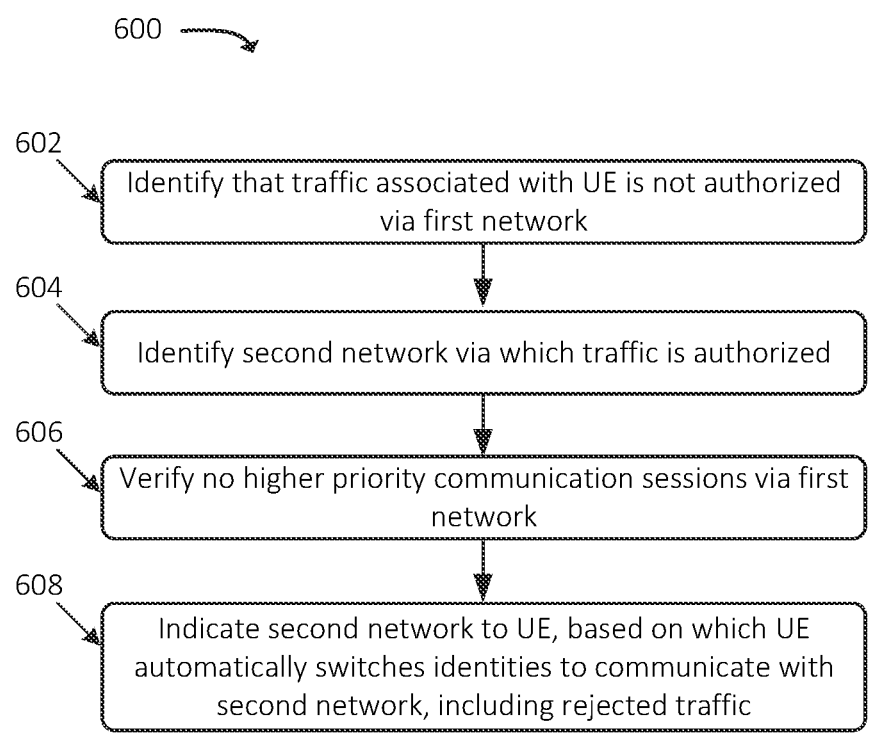
FIG. 6 illustrates an example process for causing a UE to automatically switch identities based on one or more policies, in accordance with some embodiments.

FIG. 6 illustrates an example process 600 for causing a UE to automatically switch identities based on one or more policies. In some embodiments, some or all of process 600 may be performed by policy enforcement system 107. In some embodiments, one or more other devices may perform some or all of process 600 in concert with, and/or in lieu of, policy enforcement system 107 (e.g., by policy enforcement client 109 of UE 105 and/or some other device or system).

As shown, process 600 may include identifying (at 602) that traffic associated with UE 105 is not authorized or is not supported via a first network 103-1. For example, policy enforcement client 109 may identify outbound traffic received from UE 105, a traffic request received from UE 105, a request to output downlink traffic to UE 105 (e.g., from an application server, another UE 105, etc.), and/or other traffic associated with UE 105. Additionally, or alternatively, UE 105 (e.g., policy enforcement client 109) may identify outbound traffic associated with one or more applications executing at UE 105.

Policy enforcement system 107 and/or policy enforcement client 109 may, as discussed above, determine that the traffic is not authorized via network 103-1. For example, policy enforcement system 107 and/or policy enforcement client 109 may identify attributes of the traffic (e.g., service type, endpoint identifier, etc.), attributes of UE 105 (e.g., UE identifier, device type, location, etc.), and/or other information (e.g., a current time, network load conditions, occurrence of events, etc.), and may compare such information to policies indicating whether traffic is allowed via network 103-1. As noted above, policy enforcement system 107 may also determine that the traffic is not supported by network 103-1 (e.g., based on network 103-1 not having the capability to support such traffic). In this sense, requests or communications associated with particular traffic types, services, etc. that are not supported by network 103-1 may be determined by policy enforcement system 107 to be unauthorized requests or communications (e.g., that a particular UE 105 that issues such requests, attempts to participate in such communication sessions, etc. is unauthorized to do so inasmuch as network 103-1 does not support such traffic types, services, etc).

Process 600 may further include identifying (at 604) a second network 103-2 via which the traffic is authorized. For example, policy enforcement system 107 and/or policy enforcement client 109 may, as discussed above, compare UE attributes, traffic attributes, etc. to policy information to determine one or more networks (e.g., network 103-2 and/or other networks, in this example), via which the traffic is authorized. In some situations, the traffic may be authorized via multiple networks 103, even if the traffic is not authorized via network 103-1.

Process 600 may also include verifying (at 606) that no higher priority communication sessions are active via the first network 103-1. For example, as discussed above, policy enforcement system 107 may identify a priority level of currently active communication sessions and/or of the traffic (identified at 602) that is not authorized or is not supported via network 103-1. Policy enforcement system 107 may verify that no communication sessions are active via network 103-1, and/or may verify that any currently active communication sessions via network 103-1 are of a lower priority level than the traffic (identified at 602). In situations where the traffic (identified at 602) is a lower priority level than currently active communications via network 103-1, policy enforcement system 107 may output an indication that the traffic is rejected, so as not to "kick off" or disrupt higher priority communications from network 103-1.

Process 600 may additionally include indicating (at 608) the second network 103-2 to UE 105. Based on such indication, UE 105 may automatically switch to a particular UE identity 113, in order to communicate with the second network 103-2. For example, as discussed above, UE 105 may maintain multiple UE identities 113 via UE identity repository 111 (e.g., one or more SIM cards, UICCs, etc.), where each UE identity 113 includes one or more UE identifiers that are usable by UE 105 to communicate with particular networks 103. Once UE 105 switches to a particular UE identity 113 that is associated with network 103-2, UE 105 may communicate with network 103-2 using one or more identifiers indicated by the particular UE identity 113. For example, UE 105 may re-send, retry, etc. the traffic that was rejected, in order to provide a seamless user experience to a user of UE 105.

Figure 7:
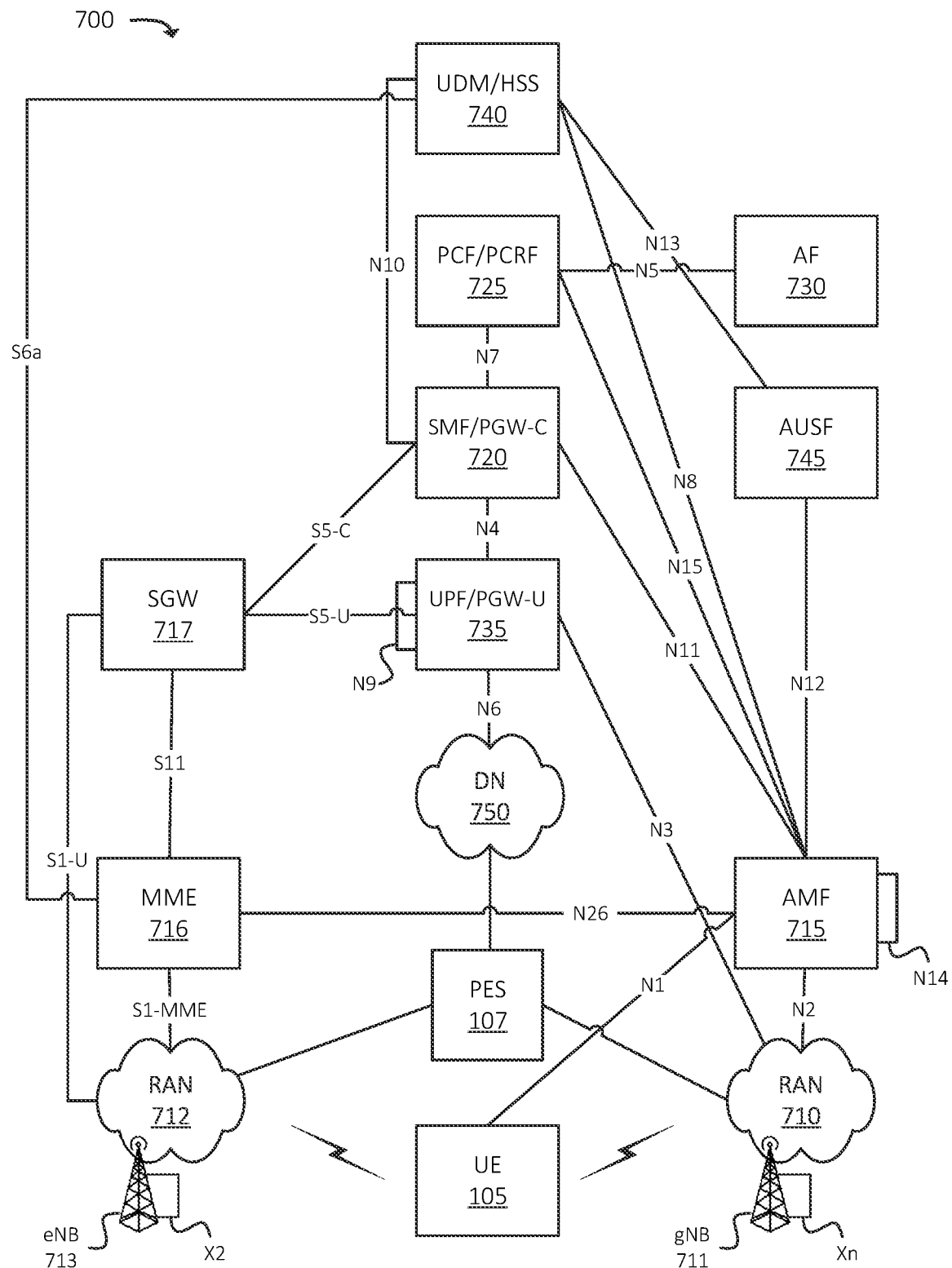
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 105, RAN 710 (which may include one or more Next Generation Node Bs ("gNBs") 711), RAN 712 (which may include one or more evolved Node Bs ("eNBs") 713), and various network functions such as Access and AMF 715, MME 716, SGW 717, SMF/PGW-Control plane function ("PGW-C") 720, Policy Control Function ("PCF")/Policy Charging and Rules Function ("PCRF") 725, Application Function ("AF") 730, UPF/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as policy enforcement system 107.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 105 may include a computation and communication device, such as a wireless mobile communication device that is capable of communicating with RAN 710, RAN 712, and/or DN 750. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 105 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 105 may communicate with one or more other elements of environment 700. UE 105 may communicate with RAN 710 via an air interface (e.g., as provided by gNB 711). For instance, RAN 710 may receive traffic (e.g., voice call traffic, data traffic, messaging traffic, signaling traffic, etc.) from UE 105 via the air interface, and may communicate the traffic to UPF/PGW-U 735, and/or one or more other devices or networks. Similarly, RAN 710 may receive traffic intended for UE 105 (e.g., from UPF/PGW-U 735, AMF 715, and/or one or more other devices or networks) and may communicate the traffic to UE 105 via the air interface. In some embodiments, base station 101 may be, may include, and/or may be implemented by one or more gNBs 711.

RAN 712 may be, or may include, a LTE RAN that includes one or more base stations (e.g., one or more eNBs 713), via which UE 105 may communicate with one or more other elements of environment 700. UE 105 may communicate with RAN 712 via an air interface (e.g., as provided by eNB 713). For instance, RAN 712 may receive traffic (e.g., voice call traffic, data traffic, messaging traffic, signaling traffic, etc.) from UE 105 via the air interface, and may communicate the traffic to UPF/PGW-U 735, and/or one or more other devices or networks. Similarly, RAN 712 may receive traffic intended for UE 105 (e.g., from UPF/PGW-U 735, SGW 717, and/or one or more other devices or networks) and may communicate the traffic to UE 105 via the air interface. In some embodiments, base station 101 may be, may include, and/or may be implemented by one or more eNBs 713.

AMF 715 may include one or more devices, systems, VNFs, CNFs, etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 105. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 105, from DN 750, and may forward the user plane data toward UE 105 (e.g., via RAN 710, SMF/PGW-C 720, and/or one or more other devices). In some embodiments, multiple UPFs 735 may be deployed (e.g., in different geographical locations), and the delivery of content to UE 105 may be coordinated via the N9 interface (e.g., as denoted in FIG. 7 by the line marked "N9" originating and terminating at UPF/PGW-U 735). Similarly, UPF/PGW-U 735 may receive traffic from UE 105 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 105.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 105 may communicate, through DN 750, with data servers, other UEs 105, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 105 may communicate.

Figure 8:
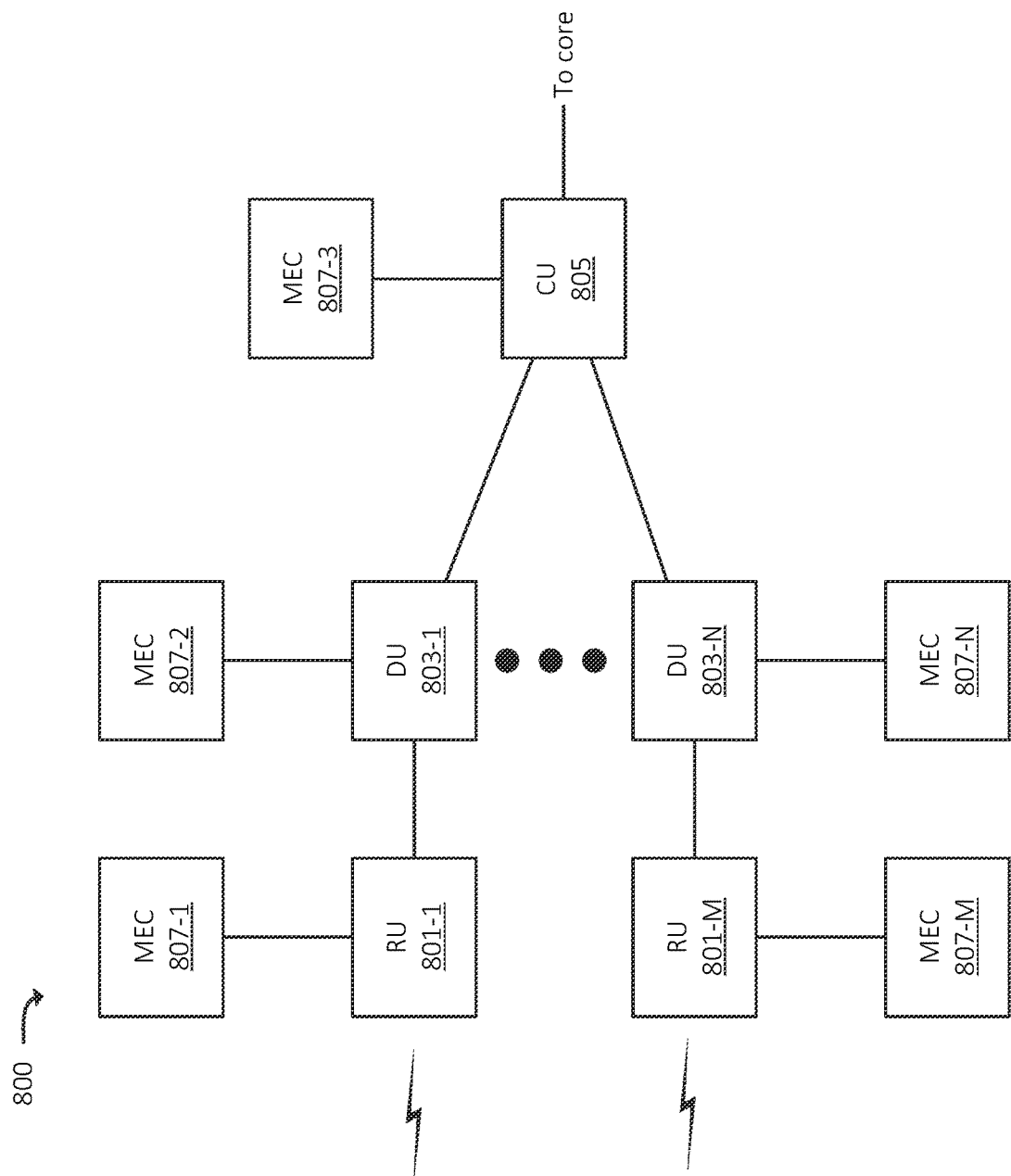
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 105 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 105, and may determine which DU(s) 803 should receive the downlink traffic. DU 803 may include one or more devices that transmit traffic between a core network (e.g., via CU 805) and UE 105 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 105.

RU 801 may include hardware circuitry (e.g., one or more RF transceivers, antennas, radios, and/or other suitable hardware) to communicate wirelessly (e.g., via an RF interface) with one or more UEs 105, one or more other DUs 803 (e.g., via RUs 801 associated with DUs 803), and/or any other suitable type of device. In the uplink direction, RU 801 may receive traffic from UE 105 and/or another DU 803 via the RF interface and may provide the traffic to DU 803. In the downlink direction, RU 801 may receive traffic from DU 803, and may provide the traffic to UE 105 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 105, via a respective RU 801.

For example, RU 801-1 may route some traffic, from UE 105, to MEC 807-1 instead of to a core network via DU 803 and CU 805. MEC 807-1 may process the traffic, perform one or more computations based on the received traffic, and may provide traffic to UE 105 via RU 801-1. In some embodiments, MEC 807 may include, and/or may implement, some or all of the functionality described above with respect to policy enforcement system 107, AF 730, UPF 735, and/or one or more other devices, systems, VNFs, CNFs, etc. In this manner, ultra-low latency services may be provided to UE 105, as traffic does not need to traverse DU 803, CU 805, and an intervening backhaul network between DU network 800 and the core network.

Figure 9:
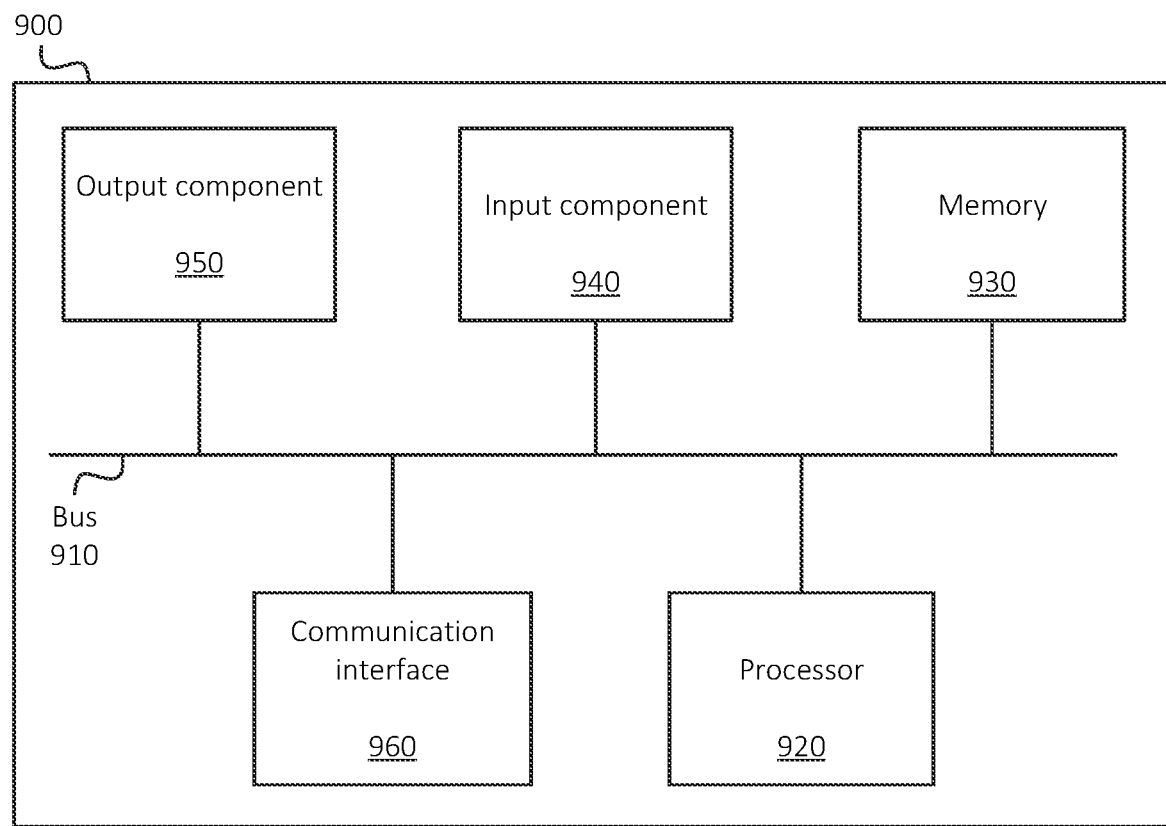
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface. In some embodiments, as noted above, communication interface 960 may include and/or may be communicatively coupled to UE identity repository 111, which may include or may be communicatively coupled to a SIM card, a UICC, or other suitable physical device or mechanism that includes one or more UE identities.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive, via a first network, traffic associated with a User Equipment ("UE") that is connected to the first network, wherein the UE maintains a plurality of UE identities;
determine, based on one or more policies, that the traffic is not authorized via the first network;
output a rejection notification to the UE based on determining that the traffic is not authorized via the first network;
receive, from the UE and in response to the rejection notification, a request for alternate network information;
identify, based on the request for alternate network information and further based on the one or more policies, a second network via which the traffic is authorized; and
indicate the second network to the UE, wherein the UE switches to a particular identity that is associated with the second network and uses the particular UE identity to output the traffic via the second network.

2. The device of claim 1, wherein the plurality of UE identities are maintained via one or more of:
one or more SIM ("Subscriber Identification Module") cards, or
one or more Universal Integrated Circuit Cards ("UICCs").

3. The device of claim 1, wherein the plurality of UE identities include another UE identity that is associated with the first network.

4. The device of claim 1, wherein the UE uses one or more UE identifiers, that are associated with the particular identity, when communicating with the second network.

5. The device of claim 4, wherein the one or more UE identifiers include at least one of:
an International Mobile Subscriber Identity ("IMSI"),
a Subscription Permanent Identifier ("SUPI"), or
a Globally Unique Temporary Identifier ("GUTI").

6. The device of claim 4, wherein the one or more UE identifiers, associated with the particular identity, are different from one or more UE identifiers used by the UE to communicate with the first network.

7. The device of claim 1, wherein the first and second networks are accessible to the UE via a same particular base station of a radio access network ("RAN").

8. A non-transitory computer-readable medium, storing a plurality of processor-executable instructions to:

receive, via a first network, traffic associated with a User Equipment ("UE") that is connected to the first network, wherein the UE maintains a plurality of UE identities;

determine, based on one or more policies, that the traffic is not authorized via the first network;

output a rejection notification to the UE based on determining that the traffic is not authorized via the first network;

receive, from the UE and in response to the rejection notification, a request for alternate network information;

identify, based on the request for alternate network information and further based on the one or more policies, a second network via which the traffic is authorized; and indicate the second network to the UE, wherein the UE switches to a particular identity that is associated with the second network and uses the particular UE identity to output the traffic via the second network.

9. The non-transitory computer-readable medium of claim 8, wherein the plurality of UE identities are maintained via one or more of:

one or more SIM ("Subscriber Identification Module") cards, or one or more Universal Integrated Circuit Cards ("UICCs").

10. The non-transitory computer-readable medium of claim 8, wherein the plurality of UE identities include another UE identity that is associated with the first network.

11. The non-transitory computer-readable medium of claim 8, wherein the UE uses one or more UE identifiers, that are associated with the particular identity, when communicating with the second network.

12. The non-transitory computer-readable medium of claim 11, wherein the one or more UE identifiers include at least one of:

an International Mobile Subscriber Identity ("IMSI"), a Subscription Permanent Identifier ("SUPI"), or a Globally Unique Temporary Identifier ("GUTI").

13. The non-transitory computer-readable medium of claim 11, wherein the one or more UE identifiers, associated with the particular identity, are different from one or more UE identifiers used by the UE to communicate with the first network.

14. The non-transitory computer-readable medium of claim 8, wherein the first and second networks are accessible to the UE via a same particular base station of a radio access network ("RAN").

15. A method, comprising:

receiving, via a first network, traffic associated with a User Equipment ("UE") that is connected to the first network, wherein the UE maintains a plurality of UE identities;

determining, based on one or more policies, that the traffic is not authorized via the first network;

outputting a rejection notification to the UE based on determining that the traffic is not authorized via the first network;

receiving, from the UE and in response to the rejection notification, a request for alternate network information;

identifying, based on the request for alternate network information and further based on the one or more policies, a second network via which the traffic is authorized; and indicating the second network to the UE, wherein the UE switches to a particular identity that is associated with the second network and uses the particular UE identity to output the traffic via the second network.

16. The method of claim 15, wherein the plurality of UE identities are maintained via one or more of:

one or more SIM ("Subscriber Identification Module") cards, or one or more Universal Integrated Circuit Cards ("UICCs").

17. The method of claim 15, wherein the plurality of UE identities include another UE identity that is associated with the first network.

18. The method of claim 15, wherein the UE uses one or more UE identifiers, that are associated with the particular identity, when communicating with the second network.

19. The method of claim 18, wherein the one or more UE identifiers, associated with the particular identity, are different from one or more UE identifiers used by the UE to communicate with the first network.

20. The method of claim 15, wherein the first and second networks are accessible to the UE via a same particular base station of a radio access network ("RAN").

* * * * *